United States Patent [19]

Tanaka et al.

[11] Patent Number: 4,897,510
[45] Date of Patent: Jan. 30, 1990

[54] COORDINATE INPUTTING DEVICE INCLUDING AN ELECTRODE TO REDUCE NOISE COMPONENTS

[75] Inventors: Atsushi Tanaka, Kawasaki; Shinnosuke Taniishi, Tokyo, both of Japan

[73] Assignee: Canon Kabushiki Kaisha, Tokyo, Japan

[21] Appl. No.: 331,029

[22] Filed: Mar. 30, 1989

Related U.S. Application Data

[63] Continuation of Ser. No. 214,218, Jun. 27, 1988, abandoned.

[30] Foreign Application Priority Data

Jul. 14, 1987 [JP] Japan .................................. 62-173987

[51] Int. Cl.$^4$ .............................................. G08C 21/00
[52] U.S. Cl. ..................................... 178/18; 367/129; 367/907

[58] Field of Search ............................. 178/18, 19, 20; 367/125, 127, 129, 907

[56] References Cited

U.S. PATENT DOCUMENTS 4,665,202  5/1987  Sato et al. ........................... 178/18

*Primary Examiner*—Stafford D. Schreyer
*Attorney, Agent, or Firm*—Fitzpatrick, Cella, Harper & Scinto

[57] ABSTRACT

A coordinate inputting device in which the vibrations imparted from a vibration pen to a vibration transmitting plate are detected by a plurality of vibration sensors so as to enable the coordinates of a vibration input point to be detected using the time it takes for the vibrations to propagate on the vibration transmitting plate. The vibration transmitting plate has noise interrupting means for preventing noise coexistent with the vibrations imparted by the vibration pair for coordinate detection from being input to the vibration sensor.

4 Claims, 7 Drawing Sheets

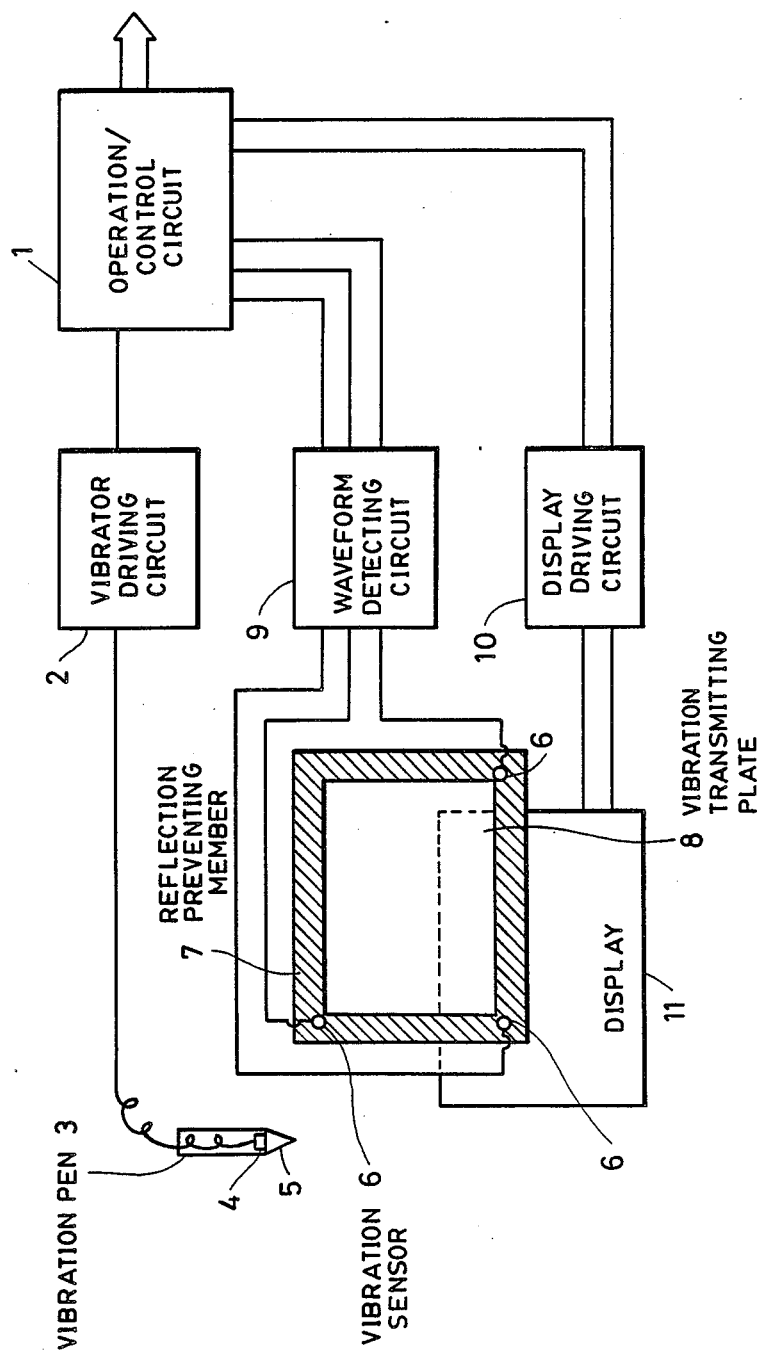
FIG. I (A)

COORDINATE INPUTTING DEVICE INCLUDING AN ELECTRODE TO REDUCE NOISE COMPONENTS

This application is a continuation of application Ser. No. 214,218 filed June 27, 1988 abandoned.

BACKGROUND OF THE INVENTION

1. Field of the Invention

The present invention relates to a coordinate inputting device, and, more particularly, to a coordinate inputting device in which the vibrations impartedto a vibration transmitting plate by a vibration pen are detected by a plurality of vibration sensors provided on the vibration transmitting plate so as to enable the coordinates representing a vibration input point to be detected using the time it takes for the vibrations to propagate on the vibration transmitting plate.

2. Related Background Art

Coordinate inputting devices for inputting manually written characters or manually drawn figures to a processing device such as a computer by utilizing various types of input pens and tablets are known in the art. In this type of information inputting method, image information composed of input characters or figures are output to a display such as a CRT display or to a recording device such as a printer.

In the above-described types of devices, coordinates on the tablet are conventionally detected, for example, according to the following methods:

(1) by detecting variations in the resistance of a sheet disposed so as to face a resistive film;

(2) by detecting electromagnetic or electrostatic induction of the opposing conductive sheets; or (3) by detecting ultrasonic vibrations transmitted from an input pen to a tablet.

The above-described methods (1) and (2) have the disadvantage that use of a resistive film or conductive film precludes formation of a transparent tablet. On the other hand, according to method (3), a transparent material such as an acrylic plastic or glass plate can be used as the tablet, enabling the tablet to be superimposed on a display such as a liquid crystal display so that images can be written thereon as if they were being written on a sheet of paper.

Although coordinate detection with ultrasonic waves has the above-described advantage over the other detection methods, it suffers from the following problem:

In order to make use of the transparency of a tablet, the vibration transmitting plate which constitutes the tablet is made of a non-conductive material such as acrylic plastic or glass plate while the vibration sensor employed is a piezoelectric element which is a ceramic interposed between electrodes. In that case, various kinds of noise, such as electrostatically induced noises, enter the electrodes of the sensors, diminishing the accuracy at which the coordinates are detected.

SUMMARY OF THE INVENTION

It is an object of the present invention to provide a coordinate inputting device in which vibrations imparted to a vibration transmitting plate by a vibration pen are detected by a plurality of sensors provided on the vibration transmitting plate so as to enable the coordinates representing a vibration input point to be detected on the basis of the time it takes for the vibrations to propagate on the vibration transmitting plate, and which includes a noise interrupting means for preventing noise components other than the vibrations used for coordinate detection from being input to the vibration sensors.

It is another object of the present invention to provide a coordinate inputting device which interrupts noises induced on the electrodes of sensors when the vibrations imparted to a vibration transmitting plate by a vibration pen are detected by sensors provided on the plate so as to prevent any noise components other than the vibrations used for coordinate detection from being input to the sensors.

BRIEF DESCRIPTION OF THE DRAWINGS

FIG. 1 (B) shows the mounting portion of a vibration sensor of the device of FIG. 1 (A);

DETAILED DESCRIPTION OF THE EMBODIMENTS

The present invention will now be described by way of example with reference to the accompanying drawings.

Figure 1:
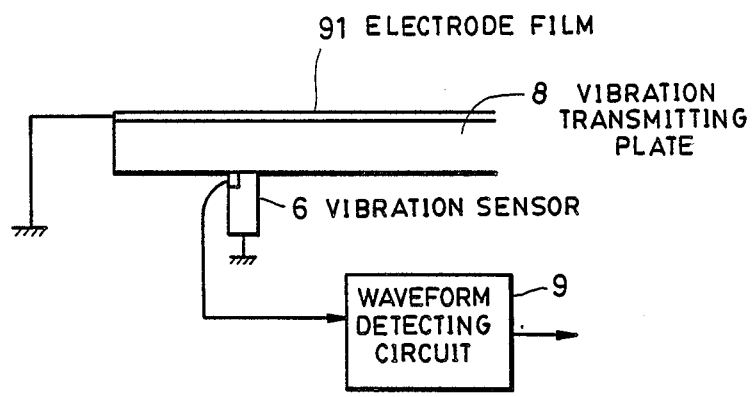
FIG. 1 (A) shows a coordinate inputting device of the present inventio,n.

Reference is first made to FIG. 1 (A) which shows an information inputting/outputting apparatus which employs the coordinate inputting device of the present invention.

The information inputting/outputting apparatus of FIG. 1 (A) is of the type in which coordinates are input by a vibration pen 3 by way of vibrations imparted to a tablet comprising a vibration transmitting plate 8 and in which an input image is displayed on a display 11 comprising a CRT positioned under the tablet on the basis of the input coordinate information.

A vibration transmitting plate 8 is made of an acrylic plastic or glass plate, and is adapted to transmit the vibrations imparted by the vibration pen 3 to three vibration sensors 6 provided at the corners thereof. In this embodiment, the coordinates of the vibration pen 3 on the vibration transmitting plate 8 are detected by measuring the time it takes for the ultrasonic vibrations to propagate from the vibration pen 3 to each of the vibration sensors 6 through the vibration transmitting plate 8.

For the purpose of preventing the vibrations that propagate through the vibration transmitting plate 8 from being reflected by the periphery of the plate, the periphery of the vibration transmitting plate 8 is supported by a reflection preventing member 7 made of silicone rubber.

FIG. 1 (B) shows a mounting portion of the vibration sensor 6 on the vibration transmitting plate 8, as viewed from the side.

As illustrated, the vibration sensor 6 is fixed by an adhesive to the under surface of the vibration transmitting plate 8 at a predetermined position. One of the electrodes of the vibration sensor 6 is grounded, and signals are output from the other electrode to a waveform detecting circuit 9. The upper surface of the vibration transmitting plate 8 is provided with an electrode film 91. The electrode film 91 is made of a transparent, electrically conductive material so as to ensure transparency of the vibration transmitting plate 8. ITO films and Nesa films which are generally used as materials for various types of transparent electrode can be used to form the electrode film 91. The electrode film 91 is grounded through a lead wire or the like.

With this arrangement, the output of the vibration sensor 6 is detected as a potential difference from the grounded potential. Since the electrode film 91 provided on the surface of the vibration transmitting plate 8 is also grounded, the noise components generated by the fingers or hands of an operator which are located close to the vibration transmitting plate 8 are directed to the grounded potential, thereby preventing them from mixing with the detection signals output from the vibration sensor 6.

Figure 2:
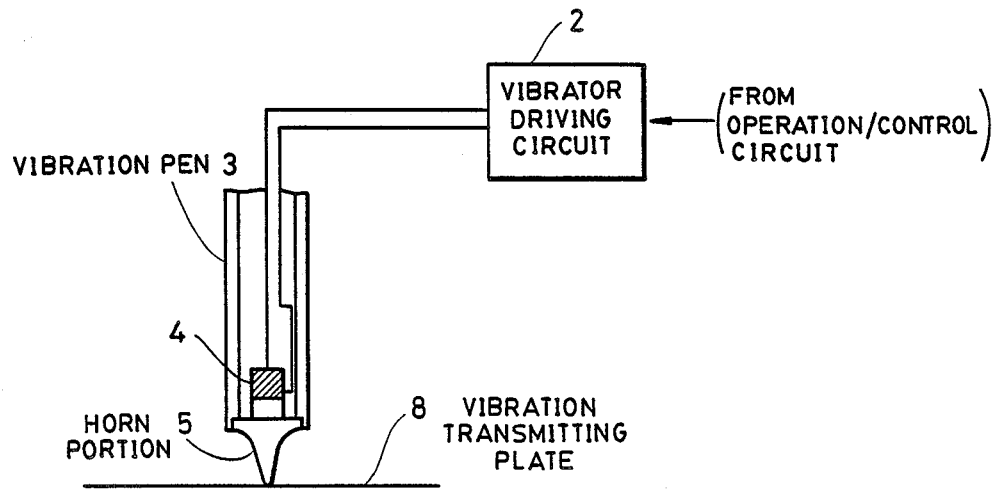
FIG. 2 shows a vibration pen of the device of FIG. 1 (A)

With reference to FIG. 2, the vibration pen 3 for transmitting ultrasonic vibrations to the vibration transmitting plate 8 incorporates a vibrator 4 composed of a piezoelectric element, and a horn portion 5 having a pointed end. The ultrasonic vibrations generated by the vibrator 4 are transmitted to the vibration transmitting plate 8 through the horn portion. The vibrator 4 incorporated in the vibration pen 3 is driven by a vibrator driving circuit 2. Signals for driving the vibrator 4 are supplied from an operation/control circuit 1 shown in FIG. 1 (A) as pulse signals having a low level, and are amplified with a predetermined gain by the vibrator driving circuit 2 which is capable of operating at a low impedance before being applied to the vibrator 4.

Electrical drive signals are converted to mechanical ultrasoic vibrations by the vibrator 4, and are then transmitted to the vibration plate 8 through the horn portion 5.

The vibration frequency of the vibrator 4 is set to a value at which waves can be generated in the vibration transmitting plate 8, made of acrylic plastic or glass. Further, a vibration mode is selected at which the vibrator 4 is vibrated mainly in the vertical direction as viewed in FIG. 2 with respect to the vibration transmitting plate 8. If the vibration frequency of the vibrator 4 is set to the resonance frequency thereof, effective vibration conversion is possible.

The vibrations transmitted to the vibration transmitting plate 8 in the manner described above are surface waves, and are therefore less affected by any perturbation in the vibration transmitting plate 8 than the surface waves.

Turning to FIG. 1 (A) again, each of the vibration sensors 6 provided at the corners of the vibration transmitting plate 8 is also composed of a piezoelectric element which converts mechanical vibrations into electrical signals. The output signal of each of the three vibration sensors 6 is input to the waveform detecting circuit 9, where it is converted into a detection signal to be processed by the subsequent operation/control circuit 1. The operation/control circuit 1 is adapted to measure the time that it takes for the vibrations to propagate, and to calculate the coordinates of the vibration pen 3 on the vibration tranmitting plate 8 from the measured time.

The detected coordinate information from the vibration pen 3 is processed by the operation/control circuit 1 in accordance with the output method adopted by the display 11. In other words, the operation/control circuit is adapted to control the output operation of the display 11 through a display driving circuit 10 on the basis of the input coordinate information.

Figure 3:
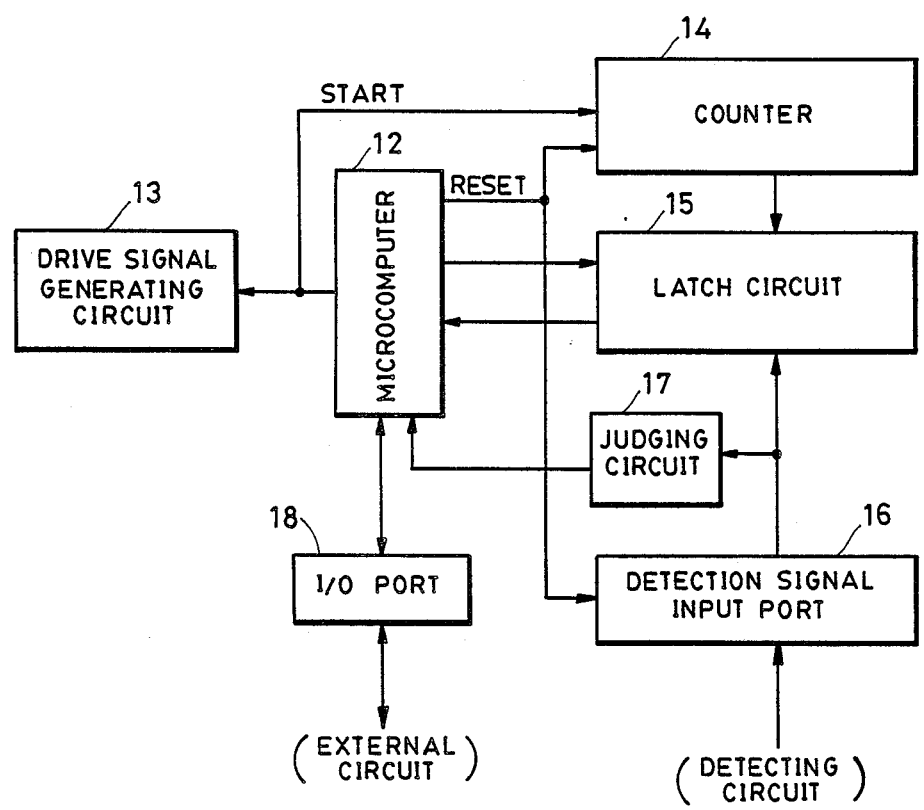
FIG. 3, is a block diagram of an operation/control circuit of the device of FIG. 1 (A)

FIG. 3 shows the structure of the operation/control circuit 1 shown in FIG. 1 (A), in particular, the structures of the driving circuit of the vibration pen 3 and the vibration detecting circuit of the vibration sensor 6.

A microcomputer 12 incorporates an internal counter, a read-only memory and a random-access memory. A drive signal generating circuit 13 outputs drive pulses having a predetermined frequency to the vibrator driving circuit 2 shown in FIG. 1 (A). The drive signal generating circuit 13 is activated by the microcomputer 12 so that the operation thereof is synchronized with that of the circuits associated with the coordinate operation.

The count value of a counter 14 is latched in a latch circuit 15 by the microcomputer 12.

The waveform detecting circuit 9 receives the output of the vibration sensor 6, and outputs it in a manner to be described later, the detection signal timing information used in the subsequent operation/control circuit to measure the vibration propagating time and thereby detect the coordinates, as well as the signal level information used to detect the writing strength. The timing information and the level information are input to the ports 16 and 18, respectively.

The timing signal which is output from the waveform detecting circuit 9 is input to the detection signal input port 16, and is then compared with the count value stored in the latch circuit 15 by a judging circuit 17, the result of the comparison being input to the microcomputer 12. In other words, the vibration propagating time which is expressed as the latched value of the data output from the counter 14 is used to calculate the coordinates of the vibration pen.

The output control of the display 11 is conducted through the I/O port 18.

Figure 4:
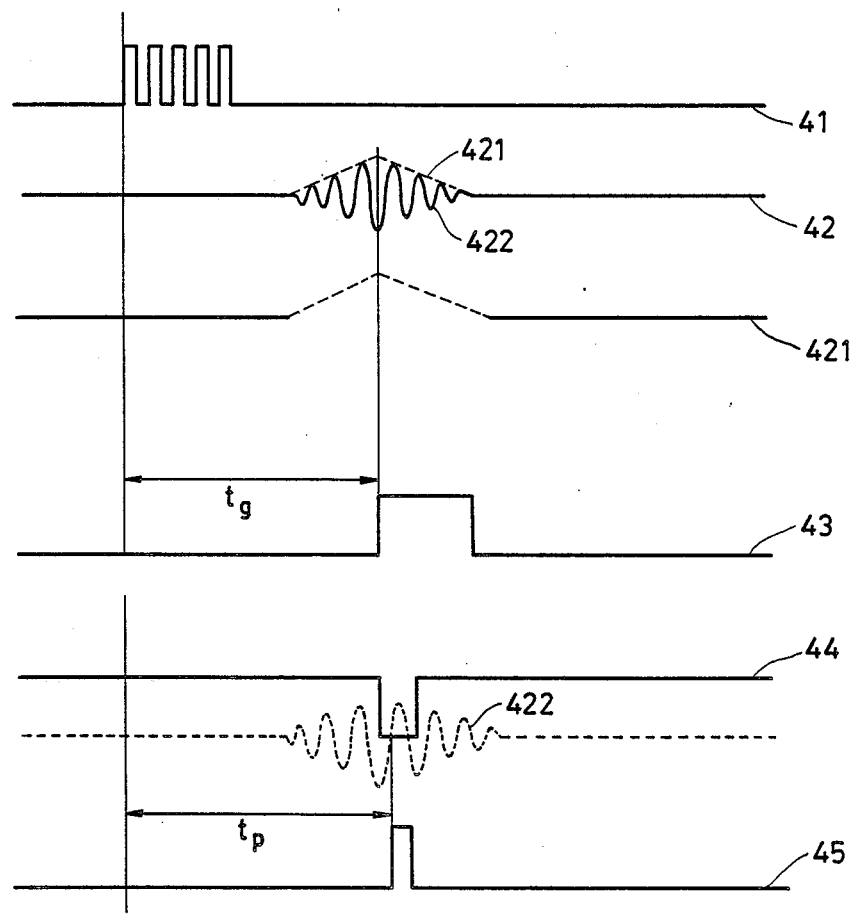
FIG. 4 illustrates waveforms used to measure the distance between the vibration pen and the vibration sensor.

FIG. 4 illustrates the waveforms which are input to the waveform detecting circuit 9 shown in FIG. 1 (A) and the calculation of the vibration progating time performed on the basis of the detected waveforms. Waveform 41 shown in FIG. 4 represents drive signal pulses applied to the vibration pen 3. The ultrasonic vibrations imparted to the vibration transmitting plate 8 by the vibration pen 3 driven by such pulses propagate through the vibration transmitting plate 8, and are detected by the vibration sensor 6.

After having travelled through the vibration transmitting plate 8 for a time $t_g$ which is a function of the distance from the vibration pen 3 to the vibration sensor 6, the vibrations reach the vibration sensor 6. Reference numeral 42 in FIG. 4 denotes the waveform of the signal detected by the vibration sensor 6. The surface waves in this embodiment are of dispersed type in which the relationship between an envelope 421 and a phase 422 of the detected waveform varies with the distance through which the vibrations have travelled.

For the purposes of the following discussion, let the group velocity at which the envelope 421 travels and the phase velocity be represented by $V_g$ and $V_p$, respectively. The distance between the vibration pen 3 and each of the vibration sensors 6 can be inferred from the difference in the relationship between the group velocity and the phase velocity.

First, the envelope 421 which has a velocity of $V_g$ is considered. When a specific point of the waveform, e.g., the peak thereof, is detected as in a waveform 43 shown in FIG. 4, a distance d between the vibration 3 and the vibration sensor 6 is expressed by:

$$d = V_g \cdot t_g \ldots \quad (1)$$

where $t_g$ is the time it takes for the peak to travel the distance d. This equation is related to one of the vibration sensors 6, but is also used to indicate the distance between the vibration pen 3 and either of the other two vibration sensors 6.

In order to determine the coordinates with a higher degree of accuracy, processing on the basis of the detection of a phase signal is conducted. Assuming the time duration between the specific points of a phase waveform 422 shown in FIG. 4 is $t_p$, the earlier point being, e.g., that corresponding to the application of the vibrations, and the later point being the first intersection with zero after the peak value, the distance between the vibration pen and the vibration sensor is expressed as follows:

$$d = n \cdot \lambda p + V_p \cdot t_p \ldots \quad (2)$$

where $\lambda p$ is the wavelength of an elastic wave, and n is an integer.

From Equations (1) and (2), the integer n is expressed by the following equation.

$$n = [(V_g \cdot t_g - V_p \cdot t_p)/\lambda_p + 1/N] \ldots \quad (3)$$

where N is a real number other than zero. A suitable number is used for N. If N is 2 and if the wavelength is within $\pm \frac{1}{2}$, it is possible to determine n.

The distance between the vibration pen 3 and the vibration sensor 6 can be accurately measured by inserting the thus-obtained value of n in Equation (2).

The vibration travelling times $t_g$ and $t_p$ shown in FIG. 4 are measured by the waveform detecting circuit 9 shown in FIG. 1. The waveform detecting circuit 9 is constructed in the manner shown in FIG. 5.

Figure 5:
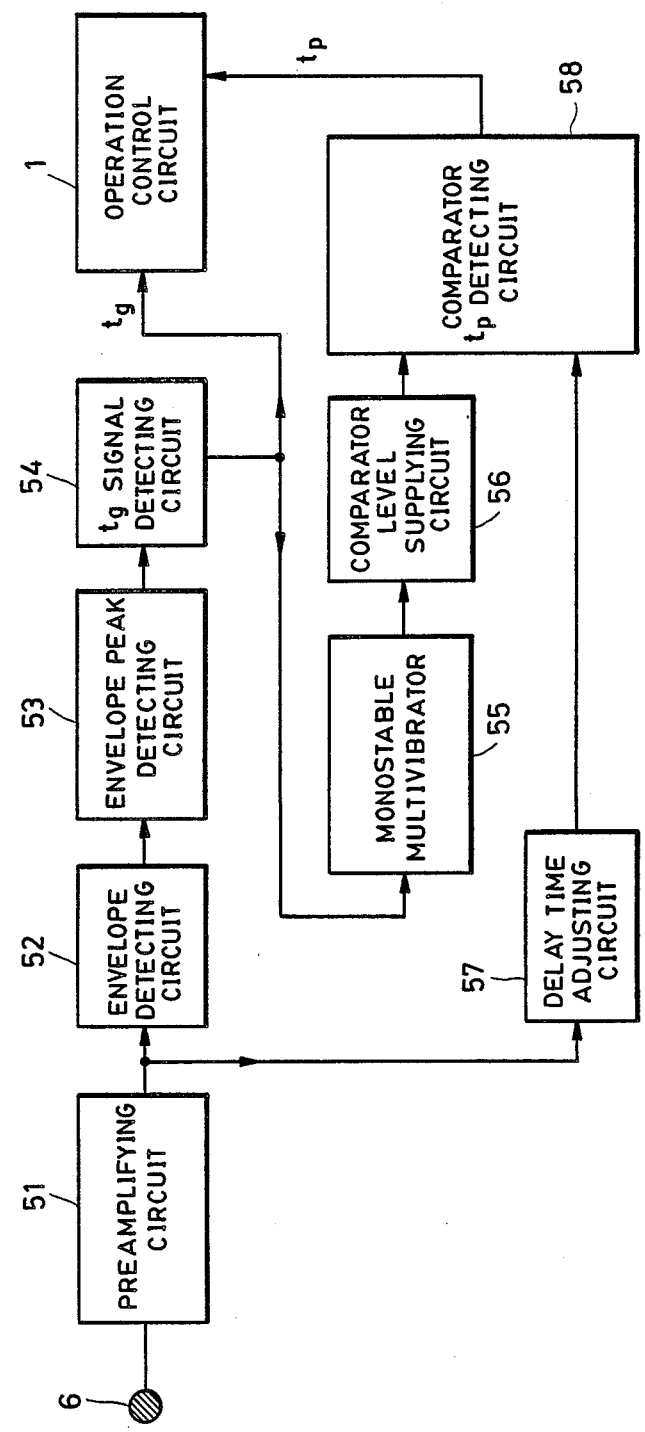
FIG. 5 is a block diagram of a waveform detecting circuit of the device of FIG. 1 (A)

In FIG. 5, the output signal from each of the vibration sensors 6 is amplified to a predetermined level by a preamplifying circuit 51, and the amplified signal is input to an envelope detecting circuit 52, where only the envelope of the detection signal is extracted. The timing of the peak of the extracted envelope is detected by an envelope peak detecting circuit 53, and the detected peak detecting signal is used by a $t_g$ signal detecting circuit 54 composed of a monostable multivibrator to form an envelope delay time detecting signal $t_g$ having a predetermined waveform. The thus-obtained envelope delay time detecting signal is input to the operation/control circuit 1.

The envelope delay time detecting signal $t_g$ is also supplied to a comparator $t_p$ detecting circuit 58 where it is used to form, together with the original signal which has been delayed by a delay time adjusting circuit 57, a phase delay time detecting signal $t_p$. The thus-obtained phase delay time detecting signal $t_p$ is input to the operation/control circuit 1.

The above-described circuitry is for one of the vibration sensors 6. The same circuitry is provided for each of the remaining vibration sensors. If the number of sensors is represented by h, then h envelope delay time detecting signals $t_g 1$ to $T_g h$ and h phase delay time detecting signals $t_p 1$ to $T_p h$ are respectively input to the operation/control circuit 1.

When the operation/control circuit shown in FIGS. 1 and 5 receives the signals $t_g 1$ to $T_g h$ and the signals $t_p 1$ to $T_p h$ through the input port 16, it fetches the count value of the counter 14 in the latch circuit 15 using the timings of these signals as trigger signals. As has been stated, the operation of the cunter 14 has been started so that it is synchronized with that of the vibration pen. Therefore, the data representing the delay times of the envelope and the phase are latched to the latch circuit 15.

Figure 6:
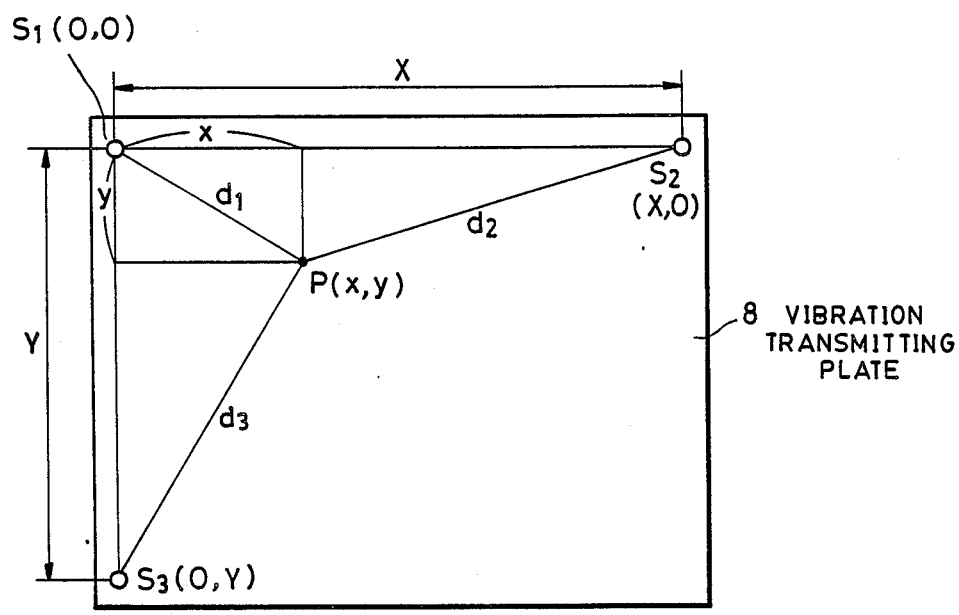
FIG. 6 ilustrates the positions of the vibration sensors.

As shown in FIG. 6, the vibration sensors 6 are disposed at the corners of the vibration transmitting plate 8 at the positions designated by reference numerals S1 to S3. In consequence, the rectilinear distances d1 to d3 between the position P of the vibration pen 3 and the positions of the respective vibration sensors 6 are obtained by the processing described in connection with FIG. 4. The operation/control circuit 1 further calculates the coordinates (x, y) of the position P of the vibration pen 3 on the basis of the rectilinear distances dl to d3 using the Pythagorean theorem, as follows:

$$x = X/2 + (d1 + d2)(d1 - d2)/2X \quad (4)$$

$$y = Y/2 + (d1 + d3)(d1 - d3)/2Y \quad (5)$$

where X is the distance along the X axis between the vibration sensor 6 located at the position S2 and the origin (position S1) and Y is the distance along the Y axis between the vibration sensor 6 located at the position S3 and the origin.

Thus, the coordinates of the vibration pen 3 are detected on a realtime basis.

If a dot is displayed on the display 11 at a position which corresponds to the thus-detected coordinates of the vibration pen 3, an image composed of elements such as points or lines input by the vibration pen 3 can be displayed following the locus of the vibration pen, as if they were being drawn on a sheet of paper.

With this arrangement, if a menu is displayed on the display 11, selection of a menu item can be made by using the vibration pen. Also, necessary data can be input by bringing the vibration pen 3 into contact with the display at a predetermined position of a displayed prompt.

The above-described image inputting/outputting apparatus can be used in various ways as an interface between the computer and the computer operator or as input/output device for an image processing apparatus.

In that case, electrostatically induced noises can be interrupted by the electrode film 91 such as that shown in FIG. 1 (B) provided on the vibration transmitting plate 8, so that the accuracy with which coordinates are detected is not diminished, enabling highly accurate coordinate detection to be conducted.

Figure 7:
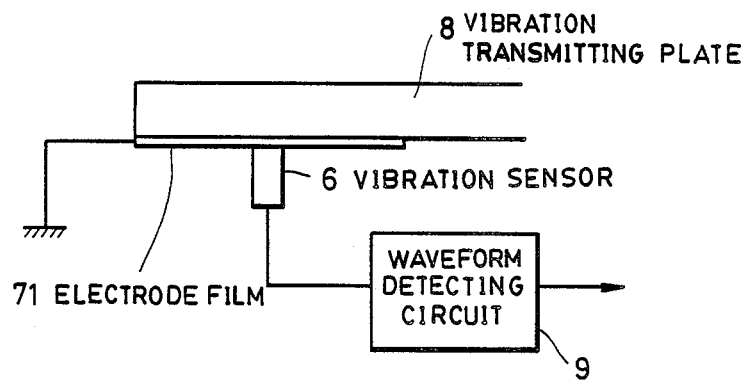
FIGS. 7 and 8 illustrate other examples of mounting the vibration sensor.
Figure 8:
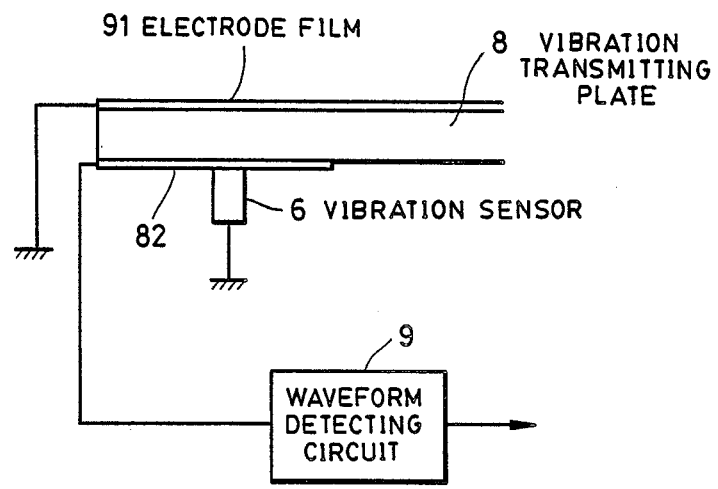

FIGS. 7 and 8 show another example of a mounting of the vibration sensor 6 on the vibration transmitting plate 8.

In the structure shown in FIG. 7, an electrode film 71 is provided on the under surface of the vibration transmitting plate 8 at a region in which the vibration sensor is provided. The electrode film 71 is grounded in the same manner as the electrode film 91. One of the electrodes of the vibration sensor 6 is firmly fixed to the electrode film 71 using a spring or the like. Detection signals of the vibration sensor 6 are output to the waveform detecting circuit 9 from the other electrode of the sensor which is provided at the rear end thereof.

A shielding film provided only on the required part of the vibration transmitting plate 8 provides a noise interruption effect similar to that obtained when the entirety of the surface of the vibration transmitting plate 8 is covered by the shielding film. A conductive paste may be used when the electrode of the vibration sensor 6 is attached to the electrode film 71 so as to improve conductivity therebetween.

In the arrangement shown in FIG. 7, only the required part of the vibration transmitting plate 8 is provided with the electrode film. Therefore, if that part is not used for inputting coordinates, an opaque metal film may be used to form the electrode film.

In the structure shown in FIG. 8, the electrode film 91 such as that shown in FIG. 1 (B) is provided on the surface of the vibration transmitting plate 8, and at the same time the electrode film 82 such as that shown be reference numeral 71 in FIG. 7 is provided on the under surface of the vibration transmitting plate 8.

In this case, the electrode film 82 is used to output the output signals from the electrode of the vibration sensor 6 provided at the head thereof. Therefore, the other electrode of the vibration sensor 6 provided at the rear end thereof is grounded, and the detection signals are output to the waveform detecting circuit 9 from the electrode film 82 which is in contact with the vibration sensor 6.

The electrode film 91 provided on the surface of the vibration transmitting plate 8 has the function of interrupting noise, like the electrode film shown 91 in FIG. 1 (B).

With this arrangement, it is not necessary for the vibration sensor to be provided with a lead wire, the output signals of the vibration sensor being easily output by utilizing the large area of the electrode film 82. For example, the output may be easily output by providing an electrode that makes contact with the electrode film 82 at the end of the vibration transmitting plate 8. The rear electrode of the vibration sensor 6 may be grounded through a spring.

The electrode film 82 provided on the under surface of the vibration transmitting plate may also be used as one of the electrodes of the vibration sensor 6. In that case, the electrode at the head of the vibration sensor 6 can be omitted, reducing the production cost of the vibration sensor 6. The vibration sensor 6 may be affixed to the electrode film 82 using an adhesive.

As will be understood from the foregoing description, in the coordinate inputting device of the present invention in which the vibrations imparted to the vibration transmitting plate by the vibration pen are detected by a plurality of vibration sensors provided on the vibration transmitting plate so as to enable the coordinates of a vibration input point to be detected using the time it takes for the vibrations to propagate on the vibration transmitting plate, the vibration transmitting plate is provided with interrupting means for preventing any noise components other than the vibrations used for coordinate detection from being input to the sensor. In consequence, the vibration sensor can be shielded from any noise components other than the vibrations used for coordinate detection, so as to allow it to detect only the vibrations required for coordinate detection, and the accuracy with which the coordinates are detected is thereby greatly improved.

What is claimed is:

1. In combination with a coordinate inputting device in which the vibrations imparted from a vibration pen to a vibration transmitting plate are detected by a plurality of vibration sensors so as to enable the coordinates of a vibration input point to be detected using the time it takes for the vibrations to propagate on said vibration transmitting plate, a noise interrupting means affixed to said vibration transmitting plate for preventing noise coexistent with the vibrations for coordinate detection from being input to said vibration sensors.

2. A coordinate inputting device combination according to claim 1, wherein said noise interrupting means is adapted to function as an electrode of said vibration sensors.

3. A coordinate inputting device combination according to claim 1, wherein said noise interrupting means comprises an electrically conductive, optically transparent member.

4. A coordinate inputting device combination according to claim 1, wherein a reflection prevention member supports a periphery of said vibration transmitting plate, thereby preventing vibrations that propagate through said vibration transmitting plate from being reflected by the periphery of said vibration transmitting plate.

* * * * *

UNITED STATES PATENT AND TRADEMARK OFFICE
CERTIFICATE OF CORRECTION

PATENT NO. : 4,897,510

DATED : January 30, 1990

INVENTOR(S) : ATSUSHI TANAKA ET AL.

It is certified that error appears in the above-identified patent and that said Letters Patent is hereby corrected as shown below:

AT [56] REFERENCED CITED

U.S. Patent Documents, "4,665,202  5/1987 Sato et al." should read --4,665,282  5/1987 Sato et al.--.

COLUMN 1

Line 13, "impartedto" should read --imparted to--.

COLUMN 2

Line 16, "inventio,n;" should read --invention;--.
Line 21, "FIG. 3," should read --FIG. 3--.

COLUMN 7

Line 21, "be" should read --by--.

Signed and Sealed this

Twelfth Day of November, 1991

Attest:

HARRY F. MANBECK, JR.

*Attesting Officer*        *Commissioner of Patents and Trademarks*